US011402348B2

(12) United States Patent
Arwatz et al.

(10) Patent No.: US 11,402,348 B2
(45) Date of Patent: Aug. 2, 2022

(54) BUBBLE DETECTION MODULE COMPRISING A NANOWIRE

(71) Applicant: Instrumems, Inc., Los Altos, CA (US)

(72) Inventors: Gilad Arwatz, Mountain View, CA (US); Jeffrey Diament, Santa Cruz, CA (US); James Borthwick, Santa Clara, CA (US)

(73) Assignee: INSTRUMEMS, INC., Los Altos, CA (US)

( * ) Notice: Subject to any disclaimer, the term of this patent is extended or adjusted under 35 U.S.C. 154(b) by 296 days.

(21) Appl. No.: 16/903,309

(22) Filed: Jun. 16, 2020

(65) Prior Publication Data

US 2020/0393396 A1 Dec. 17, 2020

Related U.S. Application Data

(60) Provisional application No. 62/862,119, filed on Jun. 16, 2019.

(51) Int. Cl.
*G01N 27/12* (2006.01)
(52) U.S. Cl.
CPC ......... *G01N 27/126* (2013.01); *G01N 27/122* (2013.01)

(58) Field of Classification Search
CPC ..... G01N 27/126; G01N 27/122; G01N 27/07
See application file for complete search history.

(56) References Cited

U.S. PATENT DOCUMENTS

| 2012/0097917 A1* | 4/2012 | Zhou | G01N 27/127 977/773 |
| 2015/0308972 A1* | 10/2015 | Akiyama | G01N 27/122 73/31.06 |
| 2016/0377485 A1* | 12/2016 | Yoon | G01K 1/12 324/71.1 |
| 2018/0058889 A1* | 3/2018 | Arwatz | G01F 1/68 |
| 2018/0252624 A1* | 9/2018 | Oka | G01N 1/2214 |

* cited by examiner

*Primary Examiner* — Alvaro E Fortich
(74) *Attorney, Agent, or Firm* — DLA Piper LLP (US)

(57) ABSTRACT

Numerous embodiments of a bubble detection apparatus and method are disclosed. In one embodiment, a bubble detection module is placed into a liquid to be monitored. The module comprises a physical structure housing a nanowire sensing element. The liquid flows through the physical structure. An electric bias is placed across the nanowire sensing element, and the resistance of the nanowire sensing element changes when a bubble is in contact with the element. A change in voltage or current of the bias signal can be measured to identify the exact instances when a bubble is in contact with the nanowire sensing element.

20 Claims, 12 Drawing Sheets

BUBBLE DETECTION MODULE COMPRISING A NANOWIRE

PRIORITY CLAIM

This application claims priority to U.S. Provisional Patent Application No. 62/862,119, filed on Jun. 16, 2019, and titled, "Bubble Detection Apparatus," which is incorporated by reference herein.

FIELD OF THE INVENTION

Numerous embodiments of a bubble detection apparatus and method are disclosed.

BACKGROUND OF THE INVENTION

Many industries have systems involving liquid flows—ranging from high volume flows in the petroleum industry to low volume flows in biomedical microfluidics. When a system depends on consistent liquid flow through tubes, the presence of pockets of gas bubbles can introduce significant problems. Bubbles can enter a liquid flow in many ways, including: outgassing from porous materials, leaks from mechanical joints, or even via dissolved gases in the liquid itself. Once bubbles are in the flow, they can cause flow modifications (e.g., partial or complete flow obstruction) or even compromise the integrity of the experimental setup itself (e.g., bubbles in microfluidic chips that contain live cell culture assays can damage or kill the living cells). Thus, it's integral to ensure that when bubbles enter critical flow systems, they can be quickly detected and removed. There exists various techniques for removing bubbles from flow apparatuses, including dissolving bubbles with pressure pulses or rerouting the bubbles with a mechanical valve in order to dispel them from the system. However, in order to activate the bubble removal system, real time bubble detection is required.

Bubble detection can be achieved manually (e.g., with a human monitoring a video stream of the flow system in order to identify the presence of bubbles) or with a sensor. Using a sensor is typically advantageous because it allows for faster detection of bubbles and can be used to automatically actuate the bubble removal system. Currently, there are many types of sensors that can be used to detect bubbles. Some options are non-contact sensors (i.e., they sit outside the flow path): such as ultrasonic and optical sensors. These sensors are often limited to certain systems (e.g. clear tubes), and are often expensive and bulky to integrate with flow systems, especially in the microfluidic domain. Furthermore, their response time is inherently limited by their principle of operation (sound or light waves must travel at least once through the width of the tube and enclosed fluid). Some other options are contact sensors (i.e., they sit inside the flow path): such as capacitive sensors or thermal flow sensors. These sensors also suffer from many shortcomings: for instance, due to their geometry they must be mounted on the inner wall of a tube. This makes them susceptible to missing bubbles that pass through the center of the tube.

For many applications, what is needed is a bubble detection sensor that sits in the center of the liquid flow path and detects the presence of bubbles in real time.

SUMMARY OF THE INVENTION

Numerous embodiments of a bubble detection apparatus and method are disclosed. In one embodiment, a bubble detection module is placed into a liquid to be monitored. The module comprises a physical structure housing a nanowire sensing element. The liquid flows through the physical structure. An electric bias is applied across the nanowire sensing element, and the resistance of the nanowire sensing element changes when a bubble comes into contact with the element. A change in voltage or current of the bias signal can be measured to identify the exact instances when a bubble is in contact with the nanowire sensing element.

In one embodiment, a bubble detection module comprises a structure comprising a first opening and a second opening, the structure forming a flow channel between the first opening and the second opening; a nanowire mounted in the structure and located at least partially within the flow channel; and sensing circuitry coupled to the nanowire for measuring a change in resistance of the nanowire when a bubble within a flow of liquid contacts the nanowire.

In another embodiment, a method of detecting a bubble in a liquid flowing through a bubble detection module comprises receiving a flow of the liquid through the bubble detection module; applying a bias current to a nanowire mounted in the bubble detection module; and measuring a change in resistance of the nanowire when a bubble in the flow of liquid contacts the nanowire.

DETAILED DESCRIPTION OF THE INVENTION

Figure 1:
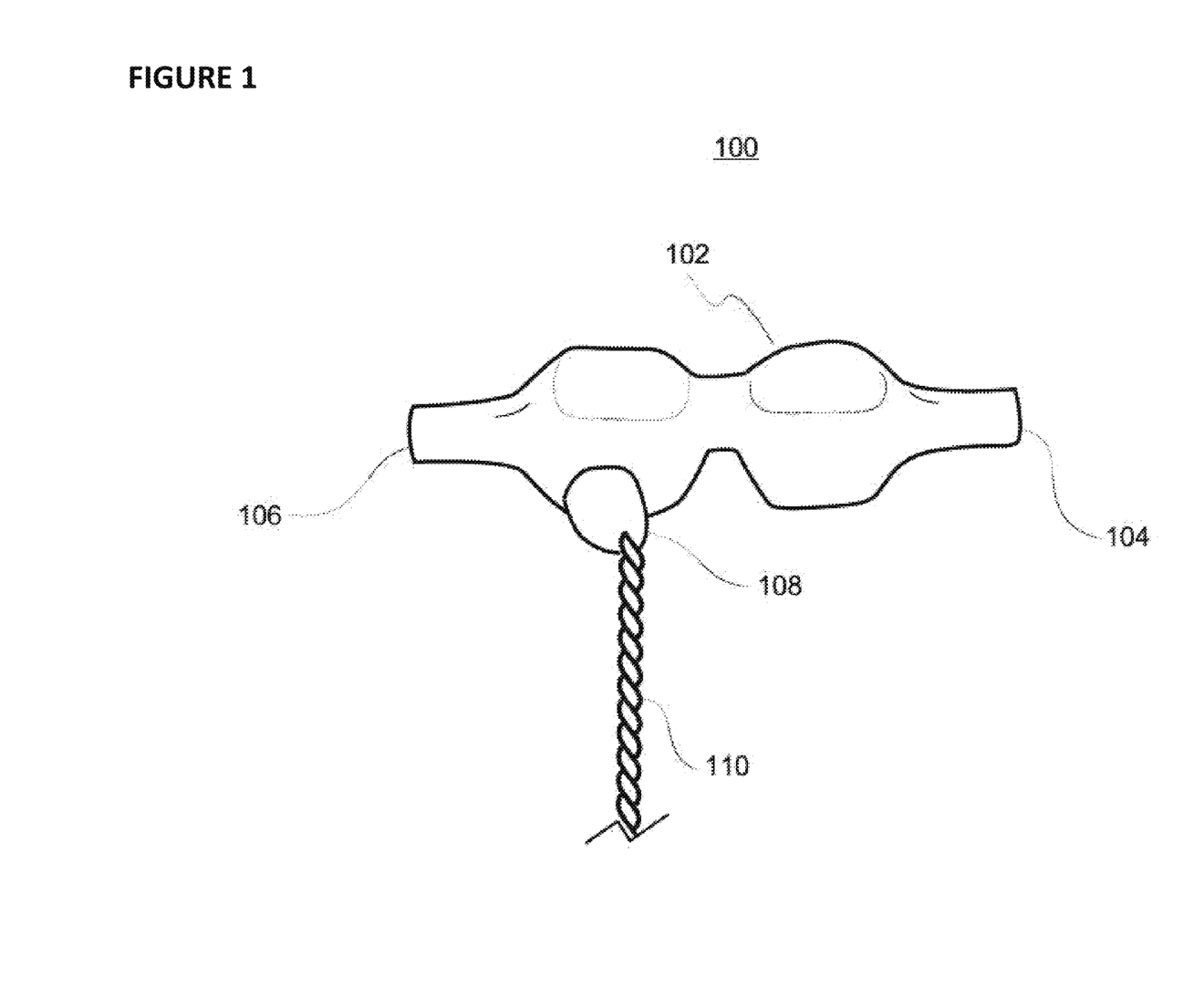
FIG. 1 shows a picture of one embodiment of a bubble detection module, which contains an internally mounted nanowire.

FIG. 1 shows one possible embodiment of a nanowire bubble detection module. Nanowire bubble detection module 100 comprises a structure such as an outer tube 102, which can be plastic, metal, glass, or any other material that is compatible with liquid flow and in some cases, biocompatible. The module 100 is meant to be placed inline with liquid flow, which enters through the upstream orifice (opening) 104, and exits through the downstream orifice (opening) 106. The module houses a PCB (printed circuit board) 108, on which a nanowire (not shown in FIG. 1, but shown in subsequent Figures) is mounted. One major advantage of using a nanowire as the primary sensing element in a bubble detection module is its extremely small size and low obstruction. The nanowire comprises a MEMS (microelectromechanical system) die that itself is very thin, and for applications involving the smallest tubes it may be mounted directly in the tube (without the PCB) in order to further minimize the flow obstruction. Since the nanowire has such a thin profile, it can be placed in the center of the flow without severely impeding the pressure drop of the liquid. This position is often preferable over non-contact bubble sensors (mounted outside of the flow) or contact bubble sensors which are often constrained to the side walls of the tube, because it allows for increased sensitivity to smaller bubbles that pass through the center of the tube. Part of the PCB 108 is exposed outside of the outer tube 102 to allow for two (or in some embodiments, four) electrical connections 110 to attach external operating circuitry to the nanowire.

Figure 2:
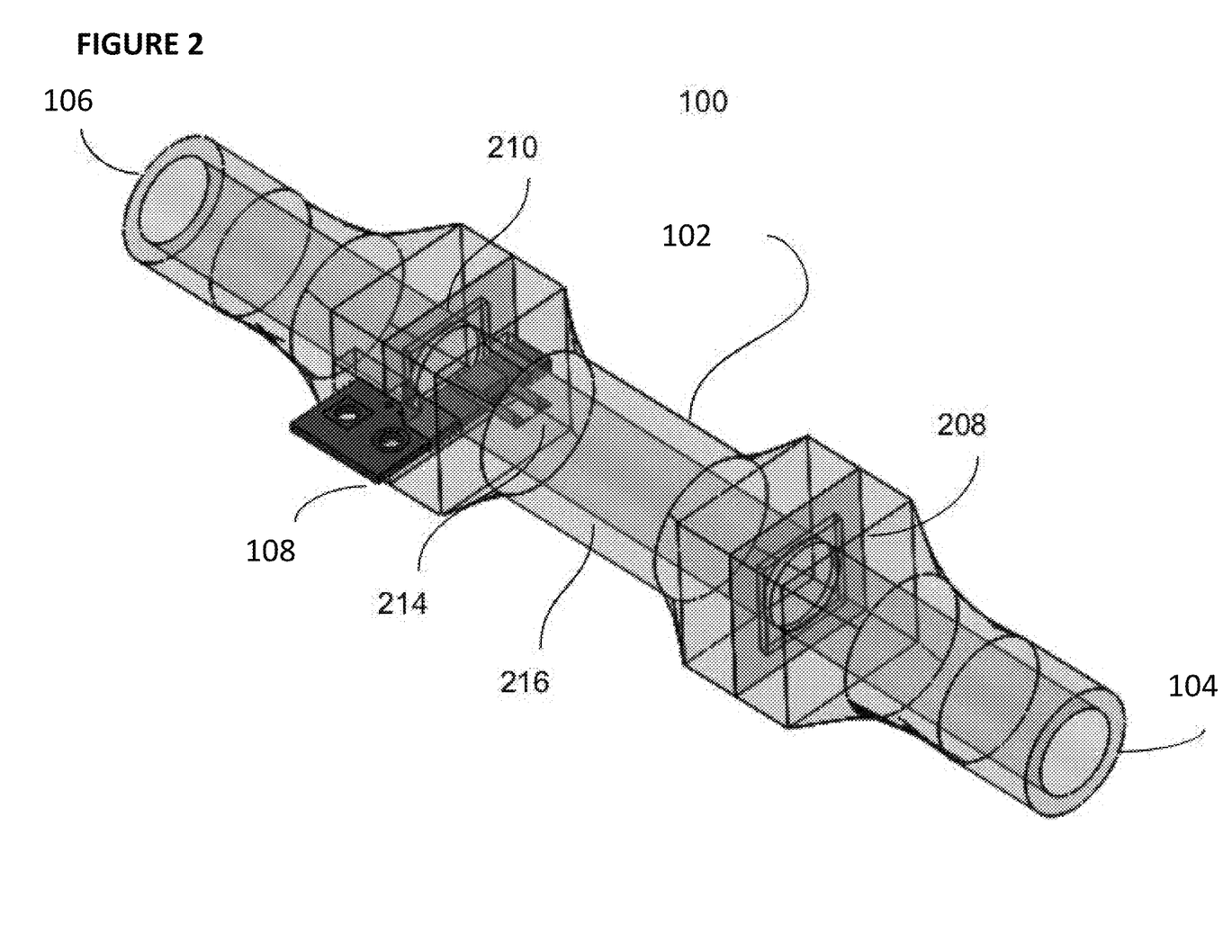
FIG. 2 shows a CAD rendering of bubble detection module to highlight the placement of the internal nanowire.

FIG. 2 shows a CAD (computer-aided design) rendering of the bubble detection module 100 shown in FIG. 1 to allow for a clearer view of the internal geometry of the device. The outer tube 102 comprises the bulk of the structure, again with upstream orifice 104 and downstream orifice 106. In this embodiment, the internal tube 216 has a fixed diameter along its entire length. However, in other possible embodiments, the diameter may be varied across the length of the device—for instance, it may be advantageous to increase the diameter at the cross section where the nanowire is mounted in order to reduce the velocity of the flow and protect the nanowire from the highest liquid velocities. The PCB 108 and the nanowire MEMS die 214 are mounted within inner tube 216 such that the nanowire is in contact with the liquid flowing through the inner tube. One possible mounting configuration is shown here, where the nanowire is mounted so that it is in the middle of the channel and directly exposed to the flow. This configuration yields the strongest bubble detection signal. However, other configurations are also possible. For example, the nanowire can be offset from the center of the inner tube 216 or even reversed in its mounting orientation. These alternative mounting configurations may serve to protect the exposed nanowire from the strongest forces imposed by the liquid flow. The module may also include a slot for an upstream filter 208 and a slot for a downstream filter 210. As can be seen, in this example, the diameter of outer tube 102 increases to accommodate the frames of upstream filter 208 and downstream filter 210. The filters can be used to protect the nanowire from impact by particulate matter in the flow. However, the filter may also cause dispersion of a bubble passing through the module, introducing some noise into the bubble detection signal—thus, a filter may be excluded from applications demanding the highest performance bubble detection.

Figure 3:
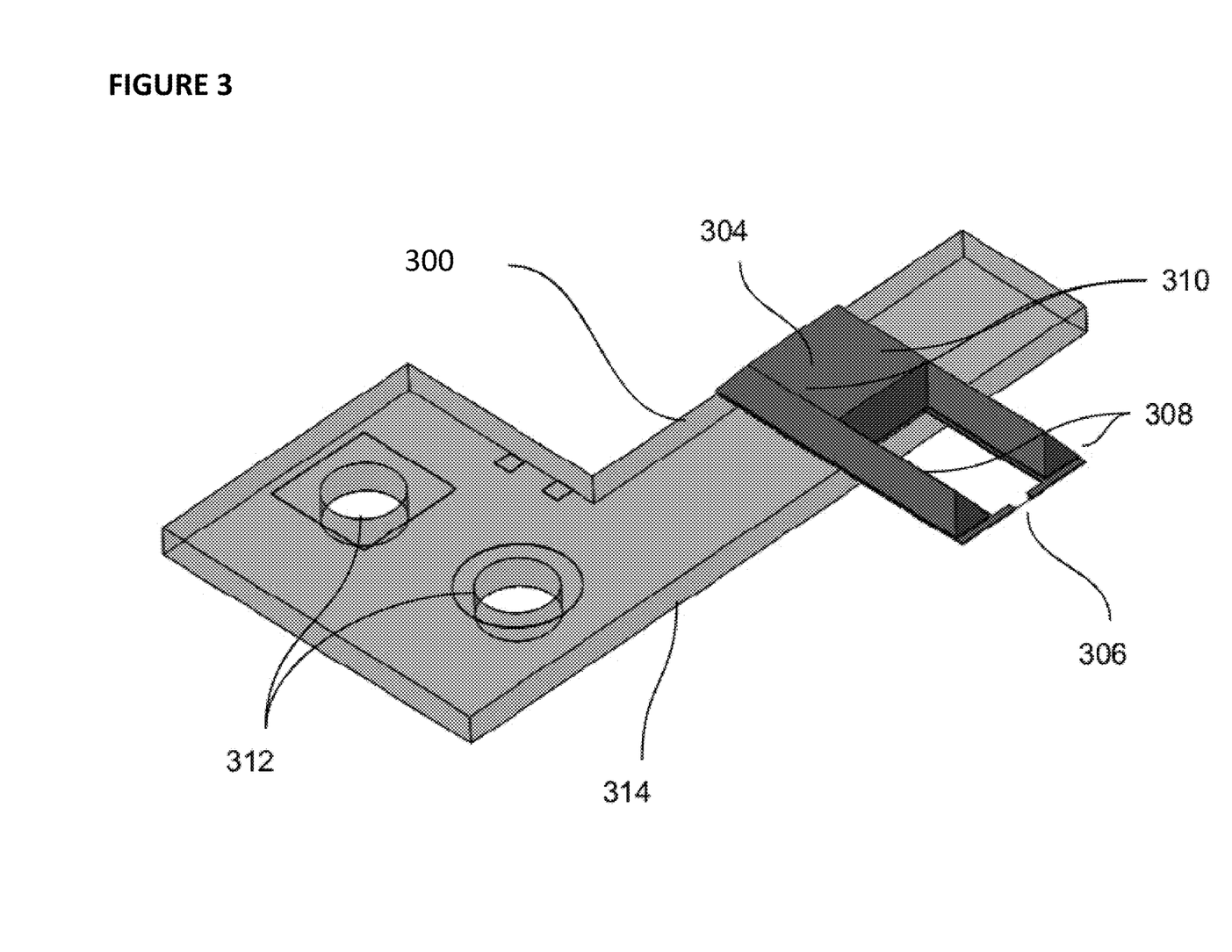
FIG. 3 shows a CAD rendering of a nanowire mounted on a PCB.
Figure 12A:
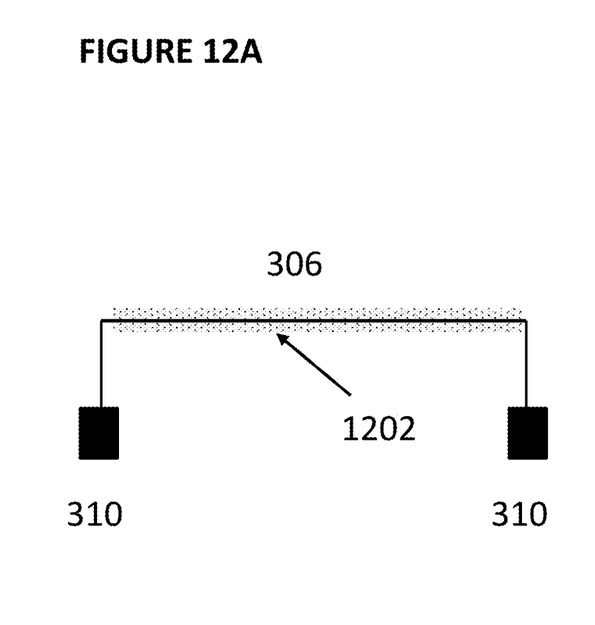
FIG. 12A depicts a nanowire sensing element with two electrodes.

FIG. 3 shows one possible embodiment of a PCB 300 that can be used to mount the nanowire within the bubble detection module and that can be used as PCB 108 in FIGS. 1 and 2. A CAD rendering is shown here to allow for a more precise specification of the very small nanowire MEMS die 304, which is not necessarily shown to scale. The PCB 300 is designed to hold the nanowire 306 in the proper orientation while minimally obstructing the flow. Thus, the leading edge 314 of PCB 300 is designed to be as thin as possible. The nanowire MEMS die 304 is soldered to the PCB 300 via two (or in some embodiments, four) electrodes 310. The nanowire MEMS die 304 is oriented such that nanowire sensing element 306 and the prongs 308 that it is suspended between protrude directly into the free stream flow. The PCB 300 in this example contains two connection points 312, which are routed to the two electrodes of the nanowire MEMS die 304 and can be used to connect the nanowire 306 to external circuitry. Additional detail regarding nanowire 306 is shown in FIG. 12A.

As further shown in FIG. 3, the nanowire sensing element 306 is free-standing (where the term "free-standing" refers to the nanowire not having any support structure other than connections at each end of the wire) and fully exposed to the flow, and conductive prongs 308 connect the two sides of nanowire sensing element 306 to respective electrodes 310. The conductive material that comprises nanowire sensing element 306 can be the same material or a different material than that which comprises conductive prongs 308 and electrodes 310. The conductive materials are typically layered on top of a nonconductive bulk substrate that has an opening surrounding nanowire sensing element 306 to allow for minimal flow obstruction.

For some applications, nanowire sensing element 306 has one or more of the following dimensions:
  a longitudinal length of at least 30 microns and/or less than 250 microns, e.g., at least 60 microns and/or less than 100 microns, and
  a typically, but not necessarily, rectangular cross-section having a width of at least 1 micron and/or less than 5 microns and/or a height of at least 0.1 microns and/or less than 0.5 microns, the cross-section being taken perpendicular to a direction of current flow in the nanoscale nanowire sensing element.

In some embodiments, the nanowire sensing element 306 is disposed on a supportive substrate (rather than free-standing). The supportive substrate can be the same material as the bulk supportive substrate, or it can be a different material. In some applications, nanowire sensing element 306 is layered directly on top of the supportive substrate. Alternatively, there may be an adhesive layer between the nanowire sensing element 306 and the supportive substrate to facilitate the deposition of the nanowire sensing element 306 on the supportive substrate. In some applications, the supportive substrate is tapered, or the density of the material of the supportive substrate is decreased by means of holes or slots in order to minimize the thermal mass adjacent to resistive film 304, while still providing adequate support.

In some embodiments, nanowire sensing element 306 disposed on a supportive substrate has one or more of the following dimensions:
  a longitudinal length of at least 30 microns and/or less than 250 microns, e.g., at least 60 microns and/or less than 100 microns, and
  a typically, but not necessarily, rectangular cross-section having a width of at least 1 micron and/or less than 5 microns, and/or a height of at least 0.1 microns and/or less than 0.2 microns, the cross-section being taken perpendicular to a direction of current flow in the resistive film.

Optionally, in embodiments where nanowire sensing element 306 is disposed on a supportive substrate, the supportive substrate can be made from any of several different known substrate materials (e.g., ceramic and other thermal insulators) and using any of several different known manufacturing techniques.

The core principle of operation for bubble detection using nanowire sensing element 306 is its change in resistance due to the different heat transfer properties of the liquid, gas, or liquid-gas mixture flowing over it. As such, nanowire sensing element 306 may be of any suitable material with a non-zero Temperature Coefficient of Resistance (TCR), and a material commonly chosen is platinum with a positive TCR of 2000-3920 ppm/° C., depending on purity, annealing, and other manufacturing steps. Other materials such as polysilicon may be used for nanowire sensing element 306 where accuracy is not as much of a priority as cost. Additionally, in some applications, a single nanowire sensing element 306 is included per die, while in other applications, multiple nanowire sensing elements 306 are included per die.

Optionally, with reference to FIG. 12A, nanowire sensing element 306 is coated with a protective material 1202 to reduce the possibility of bubbles being created due to heat generated by nanowire sensing element 306 itself during operation and to reduce the possibility of contamination of nanowire sensing element, such as from environmental contaminants, ionic contaminants accumulating on nanowire sensing element 306 over time due to the electric potential across nanowire sensing element 306, or other types of contaminants. The protective material can be a polymer or other type of material that can serve as a moisture barrier and dielectric barrier, such as the polymer known by the tradename "PARYLENE."

In another embodiment, steps are taken during the manufacturing process of nanowire sensing element 306 to make nanowire sensing element 306 more hydrophobic or hydrophilic to change the bubble-generation characteristics of nanowire sensing element 306.

Figure 12B:
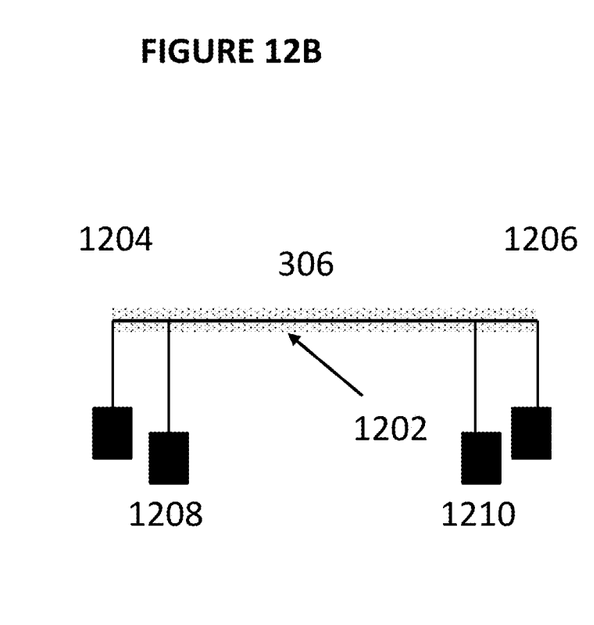
FIG. 12B depicts a nanowire sensing element with four electrodes.

FIG. 12B depicts another configuration for nanowire sensing element 306. Here, nanowire sensing element 306 is connected to four electrodes 1204, 1206, 1208, and 1210 instead of two electrodes to increase the accuracy of the system. This embodiment minimizes parasitic resistance that can exist in a two-electrode configuration such as that of FIG. 12A. Electrodes 1204, 1206, 1208, and 1210 can serve as the force+, force−, sense+, and sense− nodes, respectively.

Figure 4:
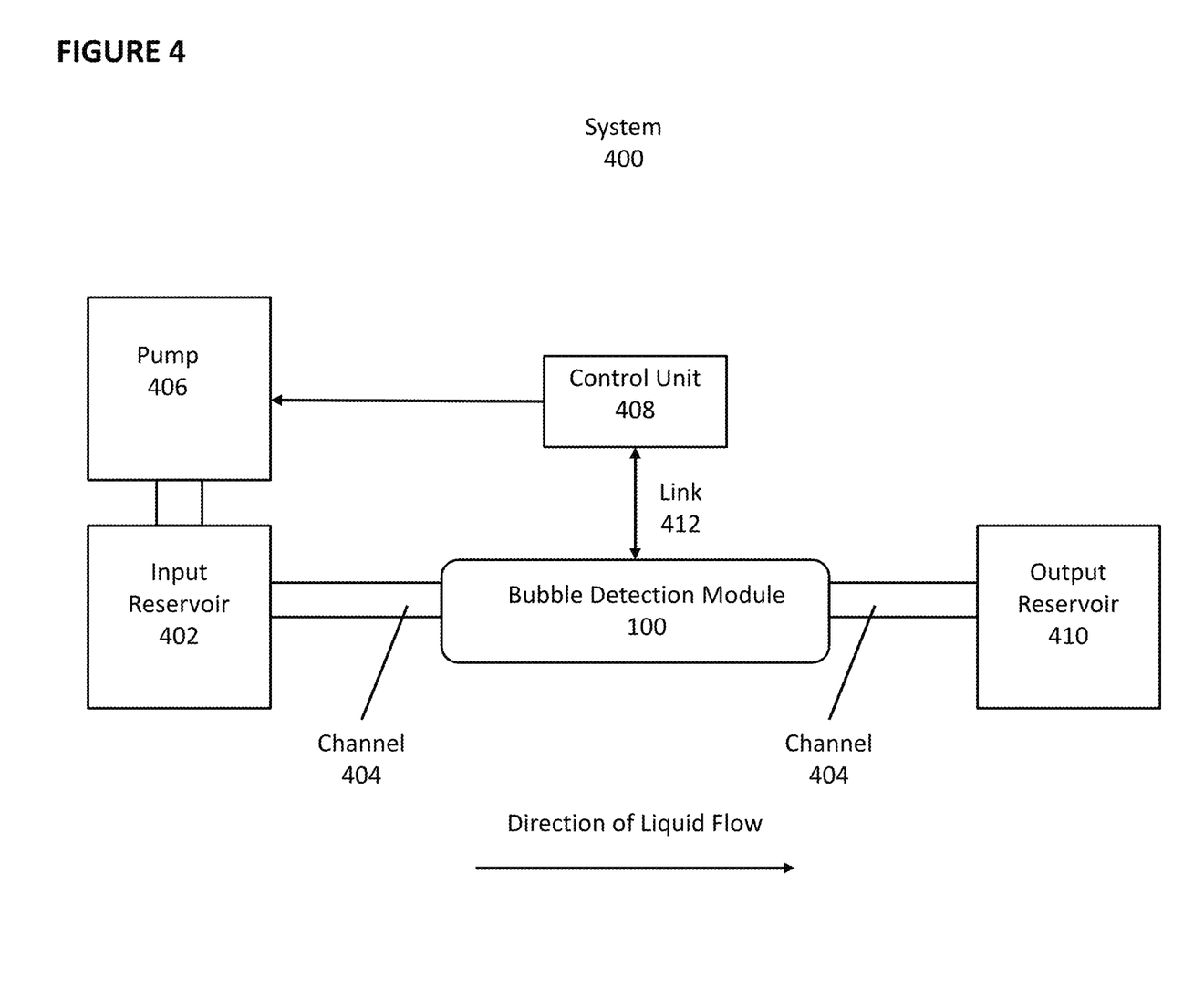
FIG. 4 depicts a system comprising a nanowire bubble detection sensor.

FIG. 4 shows an example of a system 400 comprising a nanowire bubble detection module 100. An input reservoir 402 contains liquid (e.g. water) that flows through the system. A channel 404 (which can be created using tubing, pipes, or another liquid transportation medium) is used to transport the liquid from the input reservoir 402 to an output reservoir 410. The output reservoir 410 can be the final destination for the liquid, or the liquid can be transported elsewhere using another channel (not shown). Optionally, a closed loop path can be created where the liquid from the output reservoir 410 returns to the input reservoir 402. A pump 406 is used to drive the liquid flow through the system. Optionally, the speed of the pump and the magnitude of the pumping action can be adjusted using control unit 408. Bubble detection module 100 is positioned inline with the liquid flow and is connected to the channel 404 at both the upstream and downstream orifices. Bubble detection module 100 is coupled to control unit 408 over link 412, which can be a wired or wireless connection. Control unit 408 comprises a nanowire operating circuit, such as the one described below with reference to FIG. 8.

Figure 5:
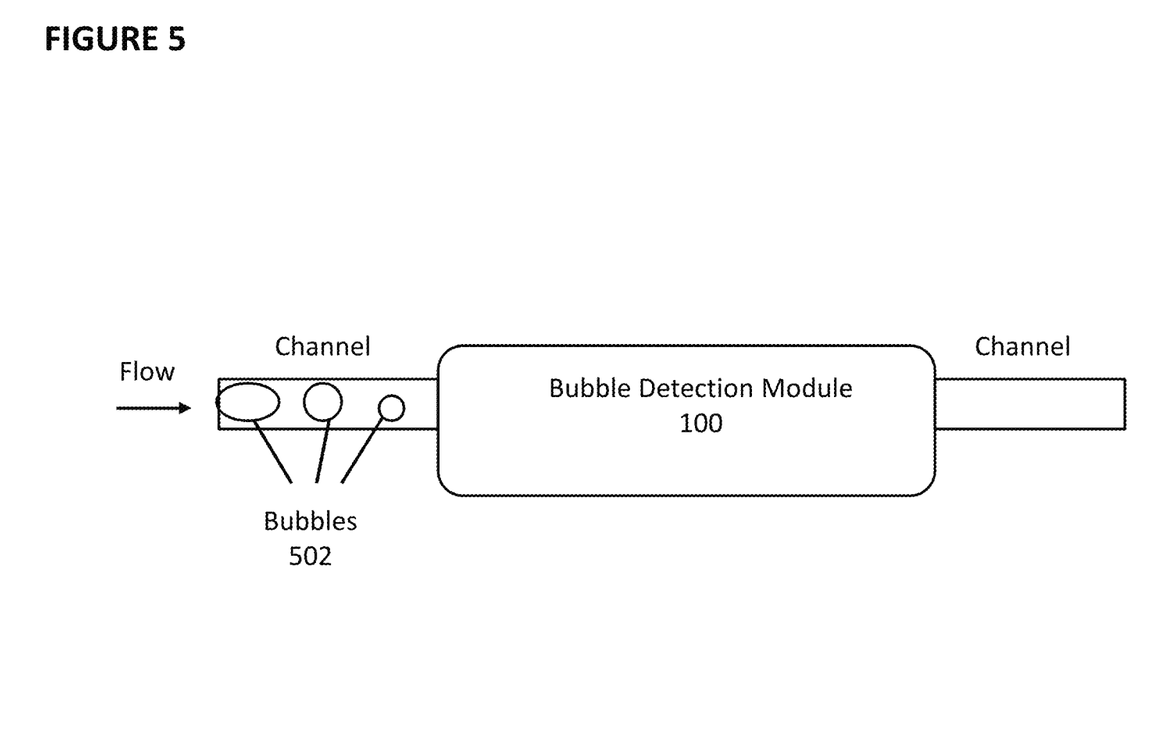
FIG. 5 depicts bubbles upstream of a bubble detection module.

FIG. 5 shows a snapshot of bubble detection module 100 as mounted in system 400 of FIG. 4, where liquid is flowing from left to right. Three bubbles 502 are shown upstream of the bubble detection module 100. The pump 406 will force bubbles 502 through the bubble detection module 100 and into the downstream flow. As shown below, bubbles such as bubbles 502 can be detected by bubble detection module 100.

Figure 6:
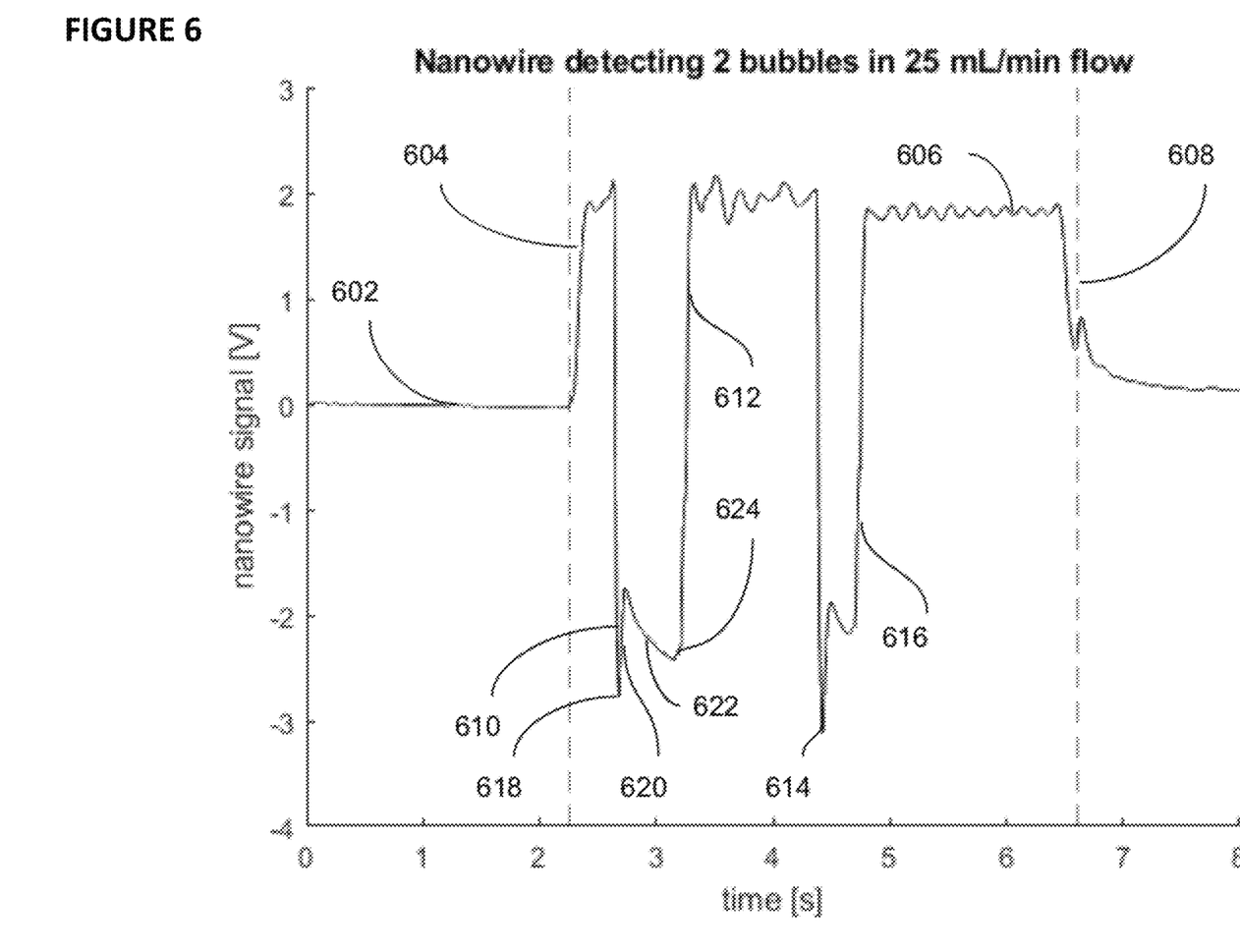
FIG. 6 shows a time history of the raw nanowire signal as two bubbles pass over the sensor.

FIG. 6. shows a time history of uncalibrated signal 602 from a nanowire sensor 306 within a bubble detection module 100 as two bubbles pass over the sensor while the mean volume flow rate is 25 mL/min. Here, a bias current is applied to one of the electrodes 310. FIG. 6 depicts an output of a measurement circuit, where the output voltage varies as the resistance of nanowire sensor 306 varies. The resistance of nanowire sensor 306 varies as its temperature varies, which is directly affected by the substance (e.g., liquid or gas bubble) that is in contact with nanowire sensor 306. In the preferred embodiment, the temperature of nanowire sensor 306 is maintained between 1° C. above the ambient temperature of the liquid and the boiling point of the liquid (e.g., 100° if the liquid is water), and optimally between 10-40° above the ambient temperature to maintain optimal operation in terms of accuracy and the reduction of extra bubble creation.

First dotted line 604 indicates that the pump is turned on and liquid begins flowing through the system. The ~5V decrease at sensor signal values 610 indicates that a first bubble has come into contact with the nanowire sensor 306 (i.e., liquid to gas transition). The ~5V increase at sensor signal values 612 indicates that the first bubble has passed over the nanowire sensor (i.e., gas to liquid transition). The same signal pattern can be seen as a second bubble first passes over the sensor and causes the signal to drop at sensor signal values 614. Then as the second bubble passes over the sensor, the signal rises up back to a nominal sensor signal values 616. Note that the pulsatile signal shown during no-bubble flow sensor signal values 606 is not an artifact of the data, but actually captures the pulsating behavior of the pump that drives the system. The second dotted line 608 indicates when the pump is shut off and the liquid flow stops. Thus, the voltage difference between the two electrodes 310 changes based on whether nanowire 306 is in contact with the liquid or the gas bubble.

In the example of FIG. 6, the two bubbles that the graph captures are different sizes—the first bubble is larger, as indicated by the greater time difference between the start and end of the characteristic bubble signal. This graph also indicates that even for different bubbles, the characteristic signal produced by the sensor shares many common features that correspond to the fundamental physics of a nanowire in liquids and gases. For instance, the initial phase change from liquid to gas flowing over the nanowire corresponds to the local minimum at 618. Then the complex flow dynamics contribute to the subsequent features in the characteristic signal profile: a rapid increase in the signal values 620, which is followed by a sustained decrease in the signal values 622 until the final local minimum 624 is reached—indicating the transition from gas to liquid, and the end of the bubble. The complex flow dynamics are influenced by factors such as: the velocity profile of gas inside a bubble, the evaporation of remaining liquid drops on the nanowire itself, and the exposure of various portions of the entire MEMS die (nanowire, stubs, prongs, etc.) to liquid-gas mixtures of variable proportions.

In some embodiments, the characteristic bubble signal produced by the nanowire can be input into machine learning algorithms that can be configured to correctly identify a bubble. The details of this signal can only be resolved with a sensor that has settling times of 1 ms or less, such as a nanowire such as nanowire 306, making it difficult to achieve comparable data with any other comparable bubble sensor (all of which have a much slower response time than the nanowire).

Figure 7:
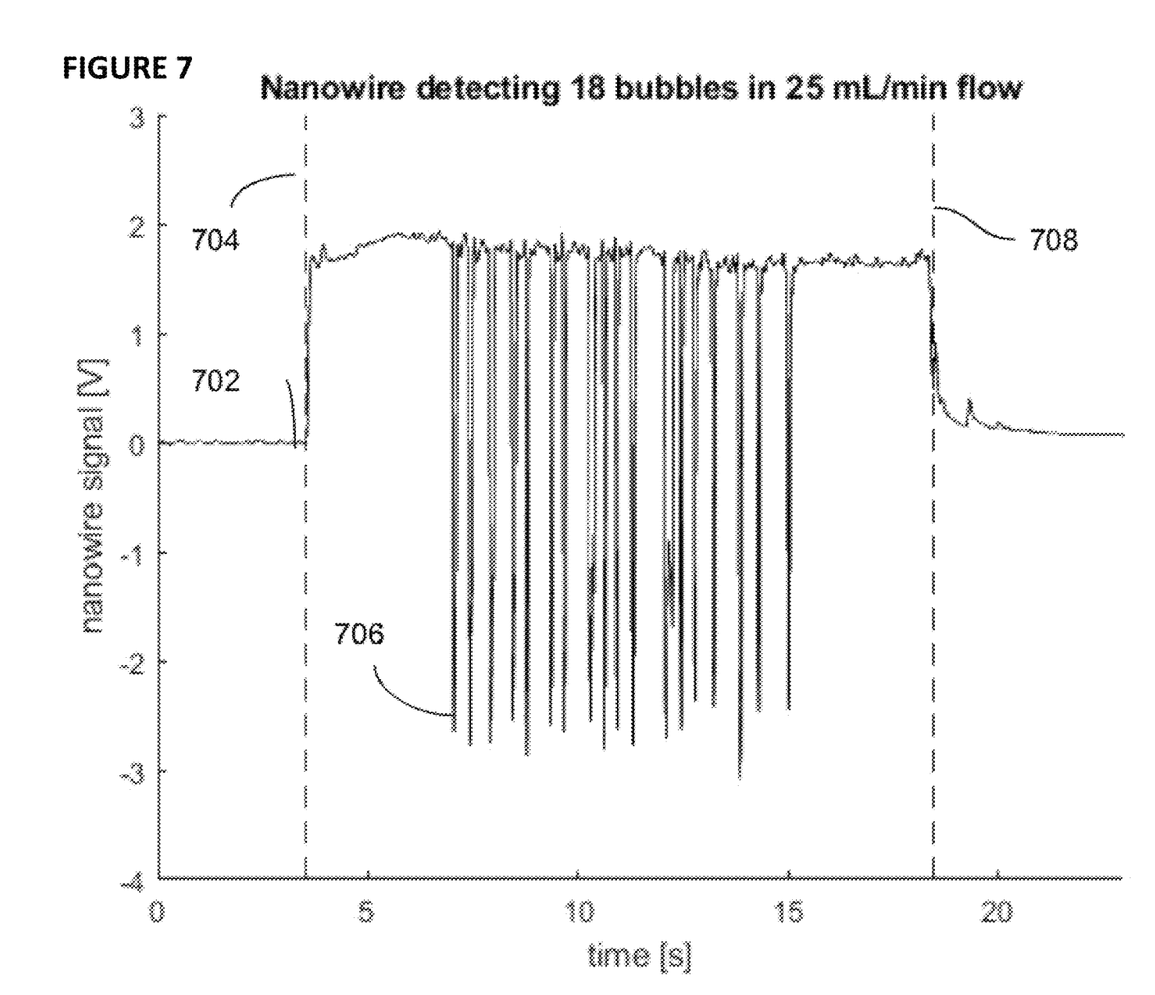
FIG. 7 shows a time history of the raw nanowire signal as eighteen bubbles pass over the sensor.

FIG. 7 shows a time history of uncalibrated signal 702 from a nanowire sensor 306 within a bubble detection module 100 as eighteen bubbles pass over the sensor while the mean volume flow rate is 25 mL/min. The first dotted line 704 indicates that a pump is turned on and liquid begins flowing through the system. The ~5V decrease in the sensor signal values 706 indicates that the first bubble has come into contact with the nanowire sensor (i.e., liquid to gas transition). The following seventeen characteristic bubble signals each indicate the passage of a bubble over the nanowire sensor. The second dotted line 608 indicates when the pump is shut off and the liquid flow stops.

Figure 8:
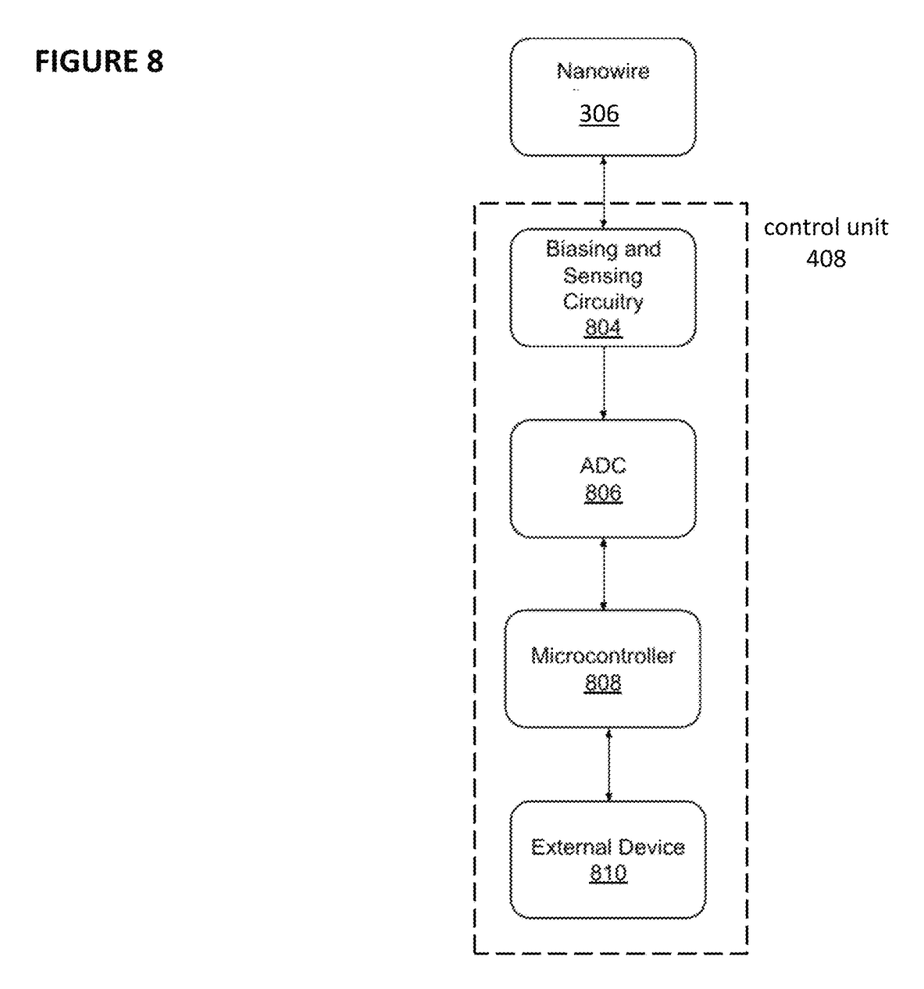
FIG. 8 shows a block diagram of one embodiment of electronics for driving and sensing a nanowire used for bubble detection.

FIG. 8 shows a block diagram of one possible embodiment of control unit 408 (previously discussed with reference to FIG. 4) to interface with a nanowire sensor 306 for bubble detection. A biasing and sensing circuit 804 connected to the nanowire 306 provides power and sensing to the nanowire 306 so that the desired parameters can be extracted from it. The biasing and sensing circuit 804 may be configured as one (or more) of a Constant Temperature Anemometer (CTA), Constant Current Anemometer (CCA), Constant Voltage Anemometer (CVA), and/or Constant Power Anemometer (CPA) circuit. The connection between the biasing and sensing circuit 804 and the nanowire sensor 802 is made through any combination of PCB, wires, cabling, connectors, or other connectivity methods. Additionally, in some embodiments, the biasing and sensing circuit (and other supporting electronics) are located at or near the nanowire sensor such that they are considered an integrated unit and may share the same substrate (i.e., a monolithic device) and/or packaging.

In one embodiment, biasing and sensing circuit 804 applies a pulsed signal to one of the electrodes 310 instead of a constant signal. A benefit of this approach would be to limit the heating of liquid by nanowire sensor 306 and to minimize bubble generation from dissolved gases. By using a pulsed signal instead of a constant signal, the nanowire sensor 306 will not be heated constantly. In one approach, during periods when the pulsed signal is at a low value (i.e., during an "off" period), the system optionally can determine the temperature of nanowire 306 by measuring its resistance.

In another embodiment, biasing and sensing circuit 804 applies a signal to one of electrodes 310 to maintain a constant differential temperature between the temperature of the nanowire sensor 306 and the liquid. Optionally, another nanowire sensor can be added to the system for the sole purpose of measuring the temperature of the liquid.

An Analog to Digital Converter (ADC) 806 connected to the biasing and sensing circuit provides signal conversion from the analog domain to the digital domain. The ADC 806 typically has a resolution of 12-bit to 24-bit, and may be a flash, successive-approximation, delta-sigma, or other type. In order to capture a bubble in the flow, the sample rate of the ADC 806 is generally at least 100 Hz but may be significantly higher in order to be able to measure other details such as the size of a bubble that has been detected. In some embodiments, the digital signal generated by the ADC 806 is sent to a microcontroller 808 for further signal processing and system operation. The ADC 806 and the microcontroller 808 may be housed in one integrated circuit package or may be discrete units connected through wiring, a printed circuit board, or other connectivity methods.

The microcontroller 808 typically has instructions stored in memory (i.e., a software program) that control required functionality steps in the bubble detection process. For example, a typical software program has a repetitive loop configured to read the ADC 806, make any required corrections to the ADC reading, compare the corrected ADC reading to various predetermined thresholds, and use that comparison to determine whether a bubble has been detected. The predetermined thresholds may be part of the software program stored in memory (i.e., "hard-coded"), or may be values stored in another portion of memory to be set separately from the software program, possibly during a calibration operation and/or according to characteristics of the fluid and bubble type to be detected. In some embodiments, the software program has further instructions to provide capability to detect other parameters such as the size of a bubble once it has been detected.

In another embodiment, microcontroller 808 is programmed to detect a bubble based on relative signal changes from biasing and sensing circuitry 804 as opposed to the absolute value of the signal. For example, a change in voltage of more than X volts might indicate a transition from liquid to bubble (i.e., the beginning edge of the bubble), and a subsequent change in voltage of more than Y volts might indicate a transition from bubble to liquid (i.e., the ending edge of the bubble). This approach would allow for easy calibration of the system based on various possible combinations of a liquid and a gas. This also would minimize any negative effect of drift that might occur in nanowire 306 over time.

The microcontroller 808 is typically connected to an external device 810 for transferring bubble detection data. The external device 810 typically contains a display for showing bubble detection information to a user, the method of displaying the information may be through a graph, text box, or other visual indicator. Connection from the microcontroller 808 to the external device 810 is typically though a digital communication bus, and common wired options include I2C, SPI, RS-232, and Ethernet; common wireless options include WiFi and the protocols known by the trademarks "BLUETOOTH" and "BLUETOOTH LOW ENERGY."

Figure 9:
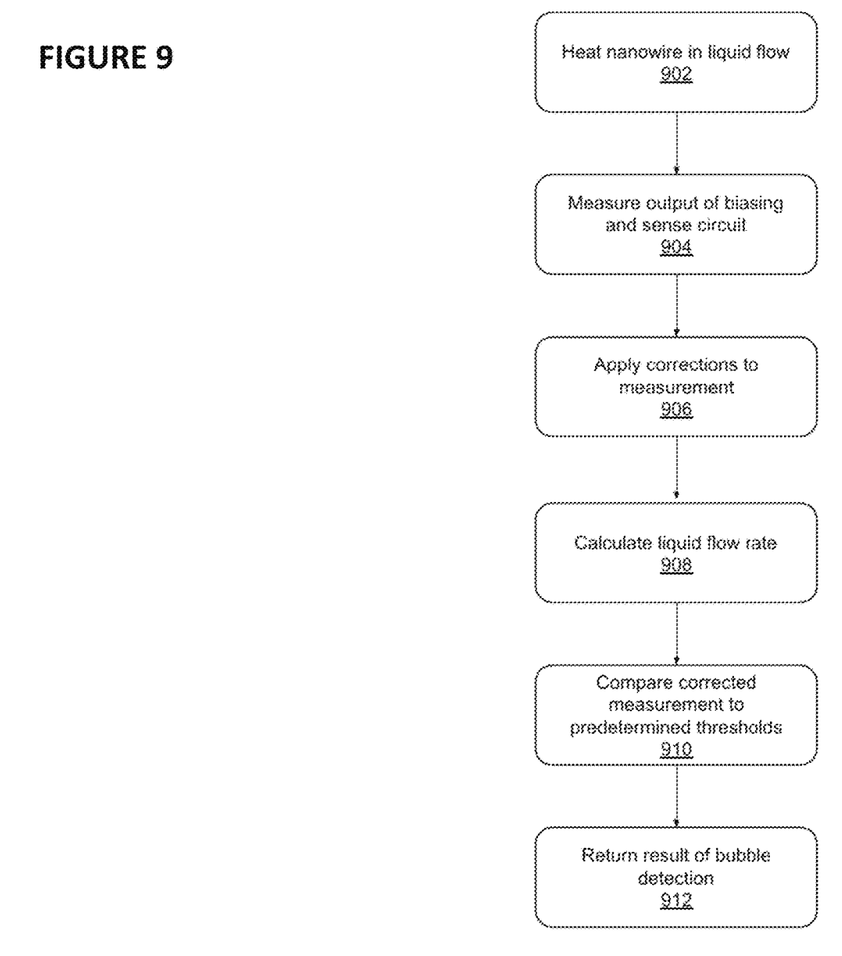
FIG. 9 is a flow chart illustrating a method of using a nanowire bubble detection to detect the presence of a bubble in the liquid flow.

FIG. 9 illustrates one possible method of using a nanowire to detect the presence of gaseous bubbles in liquid flow. First, biasing and sense circuitry 804 is used to heat the nanowire in the liquid flow, where the sensor essentially acts as a hotwire anemometer (step 902). Then, the output of the biasing and sense circuit is measured with an onboard microcontroller (step 904).

Next, corrections (e.g., temperature compensation) are applied to the measurement (step 906). These corrections may require an ambient temperature measurement of the liquid flow. This reference temperature can be achieved with an adjacent reference sensor or with the nanowire sensing element itself. If the nanowire sensing element is used to measure the ambient temperature of the liquid flow, then the biasing and sense circuit will need to allow for high frequency switching between a higher power "flow sensitivity mode" and a lower power "temperature sensitivity mode." Generally, it's preferable to use the nanowire sensing element to measure the ambient temperature because it reduces the number of sensors required to operate the system (as opposed to a reference sensor also needing to be placed in the flow path). The temperature compensation can be achieved with a number of different models based on the fluid mechanics and heat transfer of variable temperature fluid flows over the nanowire. Depending on the temperature compensation model that is used, certain input parameters characteristic of the liquid (e.g., density, viscosity, thermal conductivity) may need to be specified for the given liquid flowing through the tube. However, for some applications where the flow measurement and bubble size calculations are less critical such as bubble detection alone, a generic model can be used which does not require any additional input parameters and can apply to a wide range of liquid flows.

In order to measure the amount of liquid flow over a nanowire sensor, the nanowire sensor is typically connected to a Constant Current Anemometry (CCA), Constant Temperature Anemometry (CTA), or Constant Voltage Anemometry (CVA) circuit. A CCA circuit operates by providing a near constant current to the nanowire sensor and monitoring the change in resistance in the nanowire sensor to quantify the amount of liquid flow over it. A CTA circuit operates by maintaining the nanowire sensor near a constant, elevated temperature and monitoring the change in power required to maintain constant temperature for quantifying the amount of liquid flow over the nanowire sensor. A CVA circuit operates by providing a near constant voltage across the nanowire sensor and monitoring the change in resistance in the nanowire sensor to quantify the amount of liquid flow over it. The liquid flow rate can then be calculated according to a calibration stored on the microcontroller (step 908).

In some embodiments, this flow rate calculation can be output as an additional measurement supplied by the nanowire bubble detection module. In other embodiments, the flow rate calculation is simply used internally within the bubble detection module to determine whether or not a bubble is present in the system. The flow rate measurement is then compared to a predetermined threshold in order to determine if the fluid flowing over the sensor is a liquid (indicating nominal liquid flow through the tube) or a gas (indicating a bubble is present in the tube) (step 910). This predetermined threshold can be set for each liquid that will be present in the system (thus requiring some user input about which liquid is currently flowing through the system), or it can be a generic value that is applicable to many different liquids. The nanowire signal response is drastically different when it is immersed in liquid compared to gaseous flow, which is why the nanowire bubble detection sensor has such high performance characteristics. In general, the biasing circuit heats up the nanowire so that it achieves some thermal equilibrium, which is dependent on the thermal conductivity of the surrounding fluid. Since liquids have a much higher thermal conductivity than gases, more power is required to keep the wire at a constant elevated temperature in liquid flow as compared to gas flow (note this "constant elevated temperature" requirement is for a CTA operation mode, but the core principle of operation is similar in CCA, CVA, and CPA operation modes). The difference in power manifests itself in the output of the biasing and sense circuitry—for instance, in CTA, the output signal will be much higher in liquid than in air. Thus, the start and end of a bubble can be clearly detected by monitoring the signal for the characteristic change between liquid and gaseous flow (e.g., when the signal crosses over the predetermined threshold). Finally, the bubble detection module returns the result of the comparison to the predetermined threshold, thus indicating whether or not there is a bubble present in the system (step 912).

In some embodiments, a more complex criteria can be used to determine whether liquid or gas is flowing over a nanowire sensor (and thus detecting the presence of a bubble). For instance, the fluid (liquid or gas) flow over the nanowire sensor can be described by the following convective heat transfer equation:

$$Q = hA(T_w - T_a)$$

Where Q is the rate of heat transfer from the wire to the surrounding flow, his the convective heat transfer coefficient, A is the surface area of the hot nanowire sensor where the heat transfer takes place, $T_w$ is the temperature of hot nanowire, and $T_a$ is the ambient temperature of the surrounding fluid. When operated in CCA, CTA, or CVA mode, the nanowire signal will be directly related to power dissipation at the nanowire-fluid interface, which is a function of Q. Thus, the change in signal when the fluid flowing over the nanowire changes between a liquid and a gas (indicating the start or end of bubble), can be correlated to a change in Q. For instance, when driving the nanowire in CTA mode and assuming the flow is at a thermal equilibrium (i.e., liquid and gas bubbles are the same temperature), then the following parameters stay constant regardless of whether air or gas is flowing over the sensor: A, $T_w$, $T_a$. However, h is dependent on the fluid medium passing over the sensor (h is orders of magnitude larger in liquids as compared to gases). So when the flow over the nanowire sensor changes between a gas and a liquid, h changes, which causes Q to change, ultimately resulting in a distinct shift in the signal output by the biasing and sense circuitry connected to the nanowire sensor Similar results can be shown for CCA and CVA operation modes. Furthermore, other fluid mechanics and heat transfer equations may be used to analyze the fundamental physics of flow over the nanowire sensor in order to draw conclusions about whether the signal is indicative of a gas or liquid flow.

Figure 10:
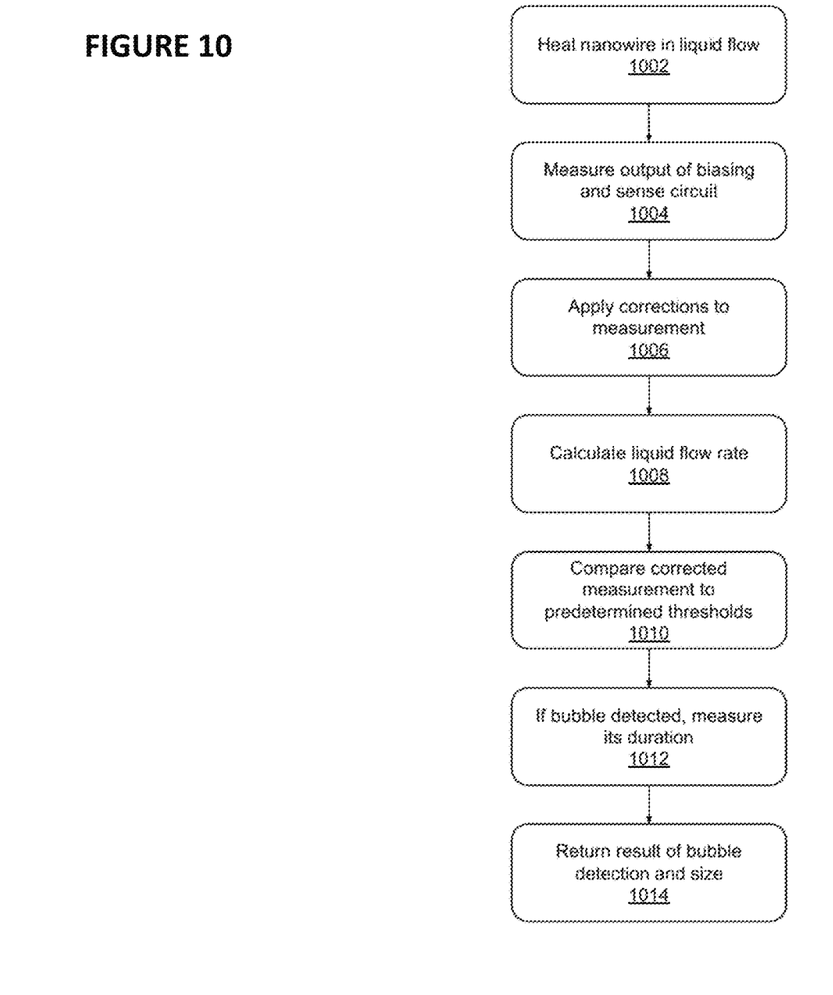
FIG. 10 is a flow chart illustrating a method of using a nanowire bubble detection module to detect the presence of a bubble in the liquid flow and calculate its size.

FIG. 10 illustrates one possible method of using a nanowire sensor to detect the presence of gaseous bubbles in liquid flow and estimate their size. The core principle of operation where the nanowire sensor is heated in liquid flow (step 1002) and the output of the biasing and sense circuitry is measured (step 1004) is the same as the embodiment described in FIG. 9. However in this embodiment, measurement correction (step 1006) (e.g., temperature compensation) is much more critical, because the bubble size calculation depends on an accurate flow rate calculation (step 1008). This calculation is then compared to predetermined thresholds to determine whether or not a bubble is present in the system (step 1010). If the bubble is present, then the duration of the bubble is recorded onboard microcontroller (step 1012). This duration is simply calculated as follows:

$$t_{bubble} = t_{start} - t_{end}$$

Where $t_{bubble}$ is the duration of the bubble, $t_{start}$ is the time when the predetermined threshold is crossed indicating the transition from liquid to gas (i.e., the start of a bubble), and $t_{end}$ is the time when the predetermined threshold is crossed indicating the transition from gas to liquid (i.e., the end of a bubble)

Using this calculation of the bubble duration $t_{bubble}$ and the calculated volume flow rate q, the volumetric size of the bubble $size_{bubble}$ can be calculated according to the following equation:

$$size_{bubble} = t_{bubble} * q$$

This calculation relies on the assumption that the flow rate over the sensor is constant throughout the beginning, passage, and end of the bubble. However, in variable flow systems, this may not be the case and an alternate method that takes into account the gaseous flow inside the bubble (and thus accounts for variations in the flow rate) will need to be used to estimate the bubble size. Finally, the bubble detection module indicates whether or not there is a bubble present in the system, and if it is present, returns the bubble size (step 1014).

The output of the methods shown in FIG. 10 could be used as a standalone monitoring tool or as the sensing component in a closed loop control system. One possible embodiment of such a closed loop control system would entail a 3-way valve that is positioned inline and downstream of the bubble detection module. During nominal liquid flow, the 3-way valve would be configured to allow flow to continue through the system unobstructed after it passed through the bubble detection module. Then as a bubble is detected by the module, the 3-way valve would be actuated such that the flow downstream of the bubble detection module would be rerouted to a waste container. The system could be calibrated such that the actuation of the 3-way valve synchronized with the size of the passing bubble, so that a minimal amount of the liquid flow is diverted into the waste container along with the bubble.

Another embodiment of this closed loop control system could include connection of the bubble detection module to a central pump that drives the system. If a bubble is detected, it may be preferable to increase the pressure of the entire system in order to overcome some of the flow resistance caused by the bubble. Furthermore, if there are pumps both upstream and down of the bubble detection module, it may be possible to actuate the pumps in a pulsed sequence in order to dissolve some bubbles once then are detected. If there is communication between the pump that drives a system and the bubble detection module, there is also the possibility to use the nanowire sensor inside the module to detect the presence of bubbles elsewhere in the system (i.e., not just over the nanowire itself). For instance, there could be some functionality built into the onboard microcontroller connected to the bubble detection module that detects if the liquid flow rate is different than what it should be for a given pump setting. This variance may be an indication of a bubble lodged elsewhere in the system (i.e., upstream or downstream of the bubble detection module). This observation could be displayed to the system operator and/or used to initiate the sequence described above of actuating the pump(s) in order to dislodge or dissolve the bubble. The connectivity between the controlling pump and the bubble detection module could be implemented with or without the 3-way valve deflection scheme described above.

Whether the nanowire bubble detection module is used as a standalone monitoring tool or as the sensing component in a closed loop control system, its extremely high frequency response (and thus ability to detect bubbles in truly real time) makes it an advantageous choice for critical systems which require the fastest possible bubble detection and/or deflecting, dislodging, or dissolving the bubble.

Figure 11A:
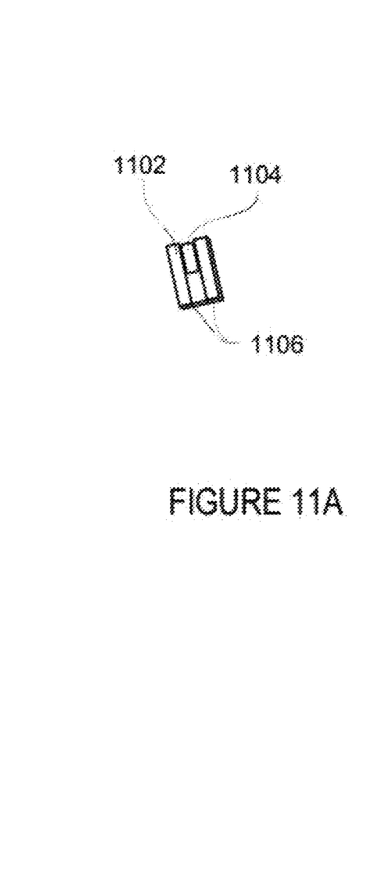
FIGS. 11A, 11B, and 11C depict components that make up an embodiment of a bubble detection module.
Figure 11B:
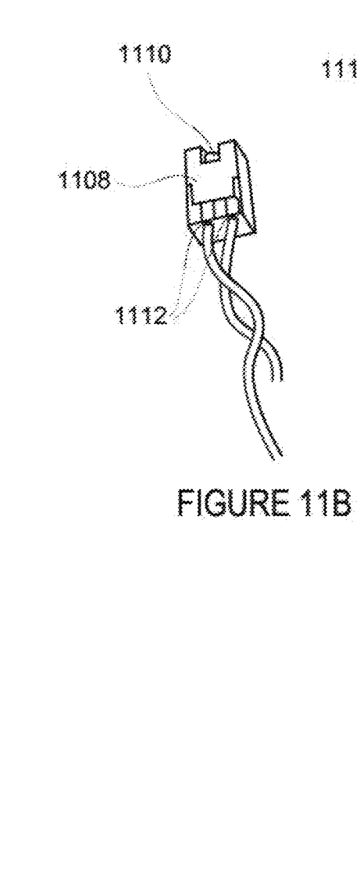
Figure 11C:
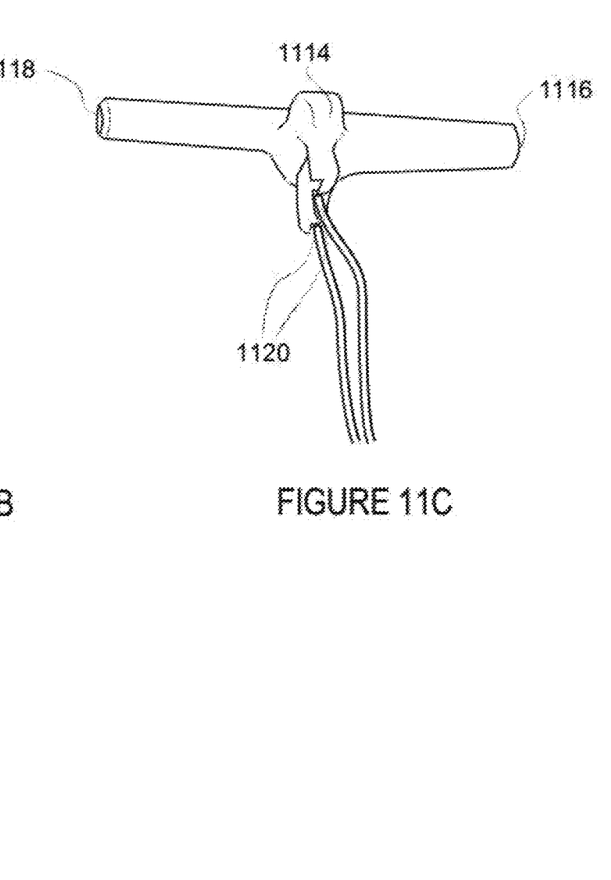

FIGS. 11A, 11B, and 11C illustrate components needed to construct other possible embodiments of a nanowire bubble detection module, which are comprised of a more minimal packaging than the module 100 previously described.

In FIG. 11A, a bare nanowire MEMS die 1102 is shown, which comprises a nanowire 1104, which is suspended between two support prongs, and is the only portion of the MEMS die that must be exposed to flow for nominal flow monitoring and bubble detection. The MEMS die also has two electrodes 1106, which can be soldered to wires and connected to external biasing and sense circuitry.

In FIG. 11B, the nanowire MEMS die 1102 is shown mounted in a minimal package 1108 that holds the die in place but leaves packaged nanowire 1110 exposed and has a gap to allow for two solder joints 1112 between the electrodes and external wires. The more minimal package can be fabricated out of many potential nonconductive materials (e.g., nylon).

In FIG. 11C, full nanowire bubble detection module 1114 is comprised of the MEMS die housed in the minimal plastic package, which is then attached to a small plastic tube containing an upstream orifice (opening) 1116 and a downstream orifice 1118. These orifices can be connected to external tubing to allow for liquid flow through the module. Just like the minimal package, the tube portion of the module can be fabricated out of many potential nonconductive materials (e.g., nylon). The two solder joints 1120 between the electrodes and external wires can be seen from the exterior of the device; however, the nanowire itself is fully enclosed in the tube. The main difference between this bubble detection module embodiment and module 100 previously described is that this tube has a much smaller diameter. Thus, in order to minimize the flow obstruction within this module, only the nanowire itself is exposed to the free stream (versus the larger module, where the entire MEMS die and the supporting PCB are exposed to the free stream). This module can be advantageous to use in very low flow environments, because the smaller tube diameter maximizes the local liquid velocity flowing over the nanowire and thus strengthens the sensor signal (as compared to a larger tube diameter).

In some embodiments, a module containing just a single nanowire sensor can be used to monitor the flow rate, temperature, and presence/size of bubbles in a liquid flow. In this case, the nanowire sensor is switched between a high and low electrical current state such that the amount of liquid flow and bubble parameters can be measured in the high current state (as previously described with either CCA, CTA, or CVA operation modes) and temperature can be measured in the low current state. Due to the small size of the sensor, the settling times when switching between the two modes is significantly smaller than it is with other larger sensor devices, and the temperature, amount of liquid flow, and presence of bubbles can all typically be accurately measured within 1 ms for the nanowire sensor.

In another embodiment, nanowire sensor 306 can conduct a cleaning mode (preferably when nanowire sensor 306 is surrounded by air and not liquid), where biasing and sensing circuitry 804 applies a high voltage to nanowire sensor 306, causing nanowire sensor 306 to become extremely hot to the point that any contaminants on nanowire sensor 306 are vaporized.

In another embodiment, bubble detection is performed along with a thermal conductivity measurement when the nanowire sensor 306 is in contact with the bubble. This data will be related to the content of the bubble and can be used to help determine if the bubble was formed from the liquid degassing or from a foreign gas entering the system. This data also can be used to identify the exact content of the gas.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A bubble detection module comprising:
   a structure comprising a first opening and a second opening, the structure forming a flow channel between the first opening and the second opening;
   a nanowire mounted in the structure and located at least partially within the flow channel; and
   sensing circuitry coupled to the nanowire for measuring a change in resistance of the nanowire when a bubble within a flow of liquid contacts the nanowire.

2. The bubble detection module of claim 1, further comprising:
   a first filter positioned between the first opening and the nanowire.

3. The bubble detection module of claim 2, further comprising:
   a second filter positioned between the second opening and the nanowire.

4. The bubble detection module of claim 1, further comprising:
   a printed circuit board, wherein the nanowire is mounted to the printed circuit board and the printed circuit board is coupled to the sensing circuitry.

5. The bubble detection module of claim 1, wherein the sensing circuitry measures a first voltage across the nanowire when the nanowire is in contact with liquid and a second voltage across the nanowire when the nanowire is in contact with a bubble in the liquid.

6. The bubble detection module of claim 1, wherein the bubble module outputs a signal indicating the presence of a bubble in the liquid flow.

7. The bubble detection module of claim 6, wherein the bubble module outputs a signal indicating the size of the bubble.

8. The bubble detection module of claim 1, wherein the nanowire is coupled to the sensing circuit through two electrodes.

9. The bubble detection module of claim 1, wherein the nanowire is coupled to the sensing circuit through four electrodes.

10. The bubble detection module of claim 1, further comprising a polymer coating on the nanowire.

11. A method of detecting a bubble in a liquid flowing through a bubble detection module, the method comprising:
    receiving a flow of the liquid through the bubble detection module;
    applying a bias current to a nanowire mounted in the bubble detection module; and
    measuring a change in resistance of the nanowire when a bubble in the flow of liquid contacts the nanowire.

12. The method of claim 11, further comprising:
    filtering the liquid before it contacts the nanowire.

13. The method of claim 11, further comprising:
    filtering the liquid after it contacts the nanowire.

14. The method of claim 11, wherein the nanowire is mounted to a printed circuit board within the bubble detection module and the printed circuit board is coupled to the sensing circuitry.

15. The method of claim 11, wherein the measuring step comprises:
    obtaining a first voltage measurement across the nanowire when the nanowire is in contact with liquid; and
    obtaining a second voltage measurement across the nanowire when the nanowire is in contact with a bubble in the liquid.

16. The method of claim 11, further comprising:
    generating a signal indicating the presence of a bubble in the liquid flow.

17. The method of claim 16, further comprising outputting a signal indicating the size of the bubble.

18. The method of claim 11, wherein the nanowire is coupled to the sensing circuit through two electrodes.

19. The method of claim 11, wherein the nanowire is coupled to the sensing circuit through four electrodes.

20. The method of claim 11, wherein the nanowire is coated with a polymer.

* * * * *